H. A. CONNERS.
EXHAUST VALVE FOR RADIATORS.
APPLICATION FILED SEPT. 11, 1919.

1,390,503.

Patented Sept. 13, 1921.

INVENTOR
Harry A. Conners
BY
Walter F. Murray
ATTORNEY

UNITED STATES PATENT OFFICE.

HARRY A. CONNERS, OF CINCINNATI, OHIO.

EXHAUST-VALVE FOR RADIATORS.

1,390,503.

Specification of Letters Patent. Patented Sept. 13, 1921.

Application filed September 11, 1919. Serial No. 323,105.

*To all whom it may concern:*

Be it known that I, HARRY A. CONNERS, a citizen of the United States of America, and a resident of Cincinnati, in the county of Hamilton and State of Ohio, have invented a new and useful Improvement in Exhaust-Valves for Radiators, of which the following is a specification.

My invention relates to that class of radiator valves which are provided with a float actuated valve for releasing water condensation from the radiator, and with a heat sensitive member adapted to be expanded by steam so as to close the valve after it has been opened for the discharge of water, to prevent the escape of steam from the radiator.

In valves of this class heretofore in use, the operation has been imperfect because the steam would at times interfere with the valve's being open, and the heat sensitive member has not responded promptly to the heat of the steam so as to secure a prompt closing of the valve after the water has been expelled from the radiator.

It is an object of my invention to provide an exhaust valve for radiators in which the steam does not impede the opening of the valve when water condensation collects in it.

Another object of my invention is to provide an exhaust valve which will close quickly after the discharge of water from the radiator.

These and other objects are attained by the means described in the specification and illustrated in the accompanying drawings, in which:—

Figure 1:
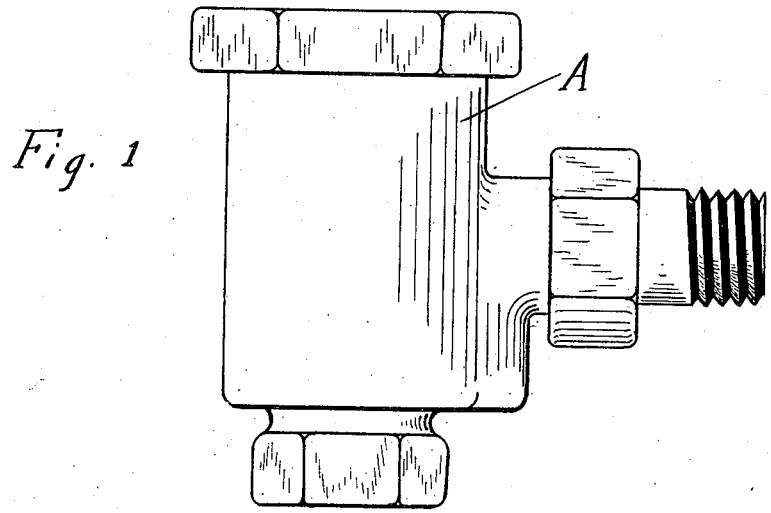
Figure 1, is a side elevation of an exhaust valve embodying my invention.
Figure 2:
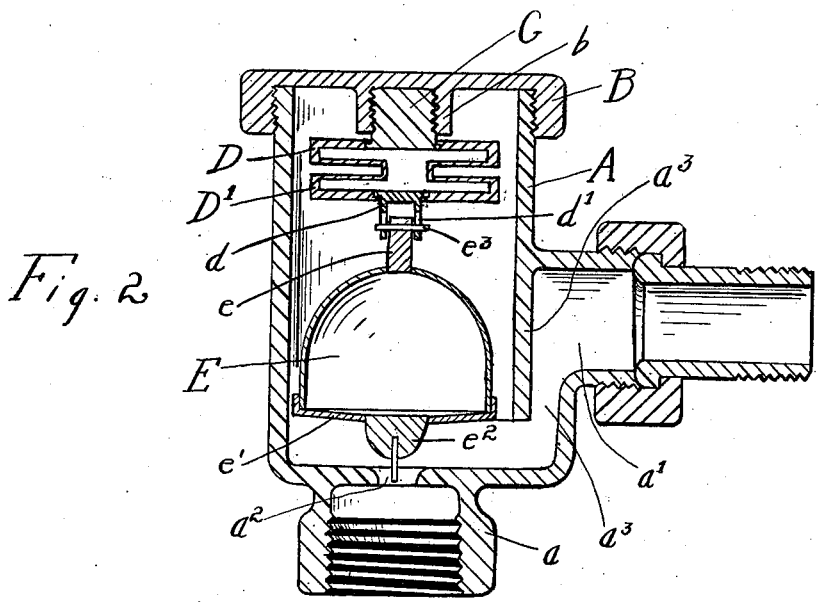
Fig. 2, is a longitudinal sectional view thereof.

The valve embodying my invention comprises, a casing A which has at its lower end an annular extension $a$, which is internally threaded for connection to an outlet pipe and projecting from its side an annular extension $a'$ which has external screw threads by means of which it may be connected to a radiator in a well known manner.

Between extension $a$ and chamber A' is an internal flange forming an axial valve seat $a^2$. Between the extension $a'$ and the interior of casing A is a semicylindrical apron $a^3$, the lower end of which is below the extension $a'$ and which leaves a contracted channel $a^3$ which leads into the interior of casing A. The upper end of the casing A is externally screw threaded to receive the screw threads of an annular flange upon cap B, which has an internal central lug $b$ which is internally screw threaded to receive a stem G.

Upon stem G is mounted a heat actuated valve regulator which comprises two expansible sealed housings D, D' upon the interior of which is confined a volatile gas. Housing D' carries an axial downwardly projecting annular lug $d$ which has at diametrically opposite sides slots $d'$. Into the lug $d$ projects the stem $e$ of a float E which carries at its lower end $e'$ a valve $e^2$ which is adapted to seat upon the valve seat $a^2$. Stem $e$ has a transverse pin $e^3$ which engages the slots $b'$ in the lug $d$.

In operation float E will raise only after enough water surrounds it in chamber A: thus no steam escapes from the radiator through my valve. Apron $a^3$ keeps any hot water from contacting with an expanding housings D, D'.

When steam is in the system, the housing D, D' are expanded. However, the play between stem $e$ and extension $d^3$ permits the float to raise to release any water that flows into the valve. Thus my valve prevents the radiators from becoming water-bound. When the radiators become cool housing D, D' contract and raise valve $e$ from its seat, ready for the next heating operation.

Having thus described my invention, what I claim is:—

1. In a radiator exhaust valve the combination of a casing having an extension upon its side adapted to be connected to a radiator and an apron upon its interior extending below the extension and forming with the walls of the casing a float chamber open at its lower end and having at its lower end an internal valve seat, a heat sensitive expansible member mounted upon the interior of the float chamber, a float suspended from the expansible member within the aforesaid chamber and a valve carried by the float and adapted to contact with the valve seat.

2. In an exhaust valve the combination of a casing having upon its interior a float chamber having an outlet in its bottom surrounded by a valve seat, an expansible sealed housing within which is confined a volatile gas and which is secured to the top of the float chamber, means for suspending a float from the expansible member, a float, and a valve carried by the float and adapted to contact with the valve seat in the bottom of the float chamber.

In testimony whereof, I have hereunto subscribed my name this 6th day of September, 1919.

HARRY A. CONNERS.